March 16, 1965     H. STREHLE ETAL     3,173,349
CAMERAS
Filed July 17, 1961     3 Sheets-Sheet 1
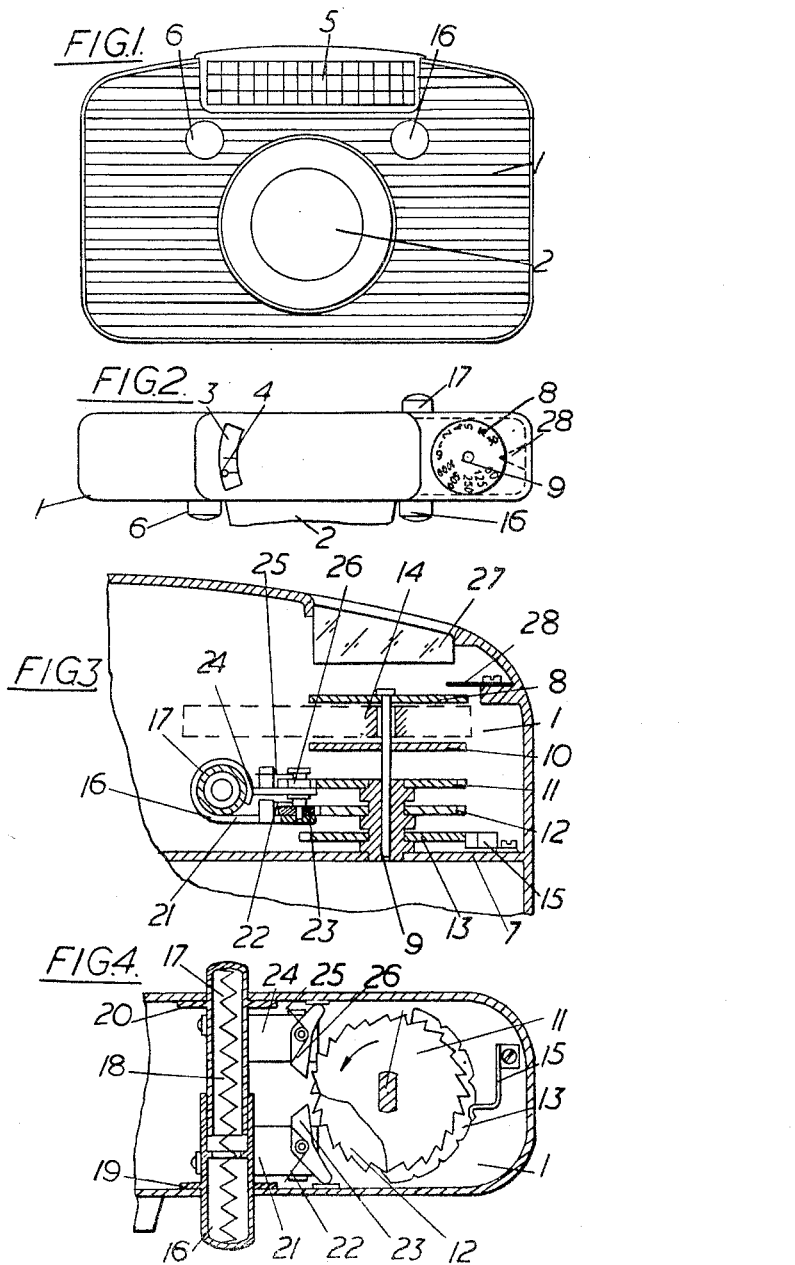
Inventors
HORST STREHLE
GÜNTER HEERKLOTZ
By Irwin J. Thompson
Attorney

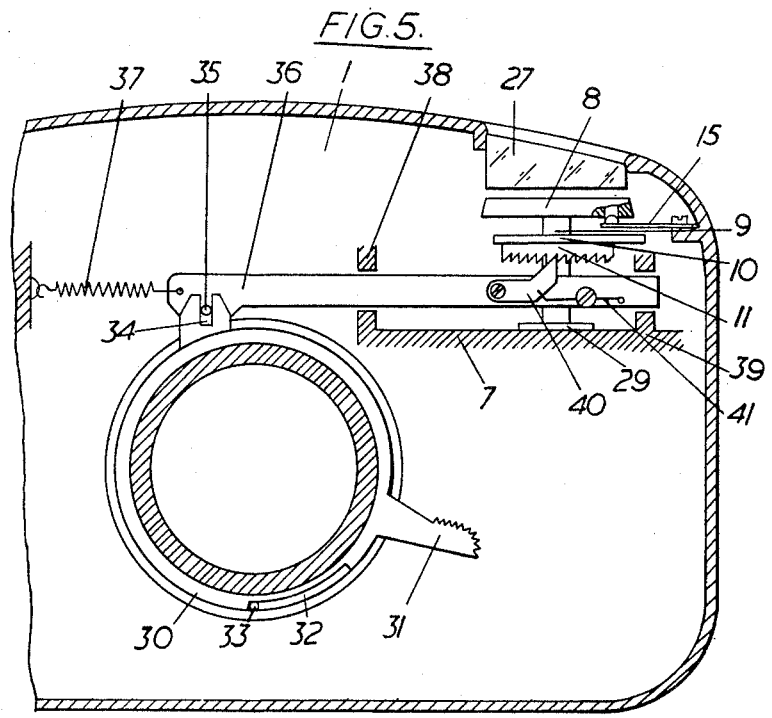

March 16, 1965 H. STREHLE ETAL 3,173,349
CAMERAS
Filed July 17, 1961 3 Sheets-Sheet 3

Inventors
HORST STREHLE
GÜNTER HEERKLOTZ
By Irwin S. Thompson
Attorney

United States Patent Office 3,173,349
Patented Mar. 16, 1965

3,173,349
CAMERAS
Horst Strehle and Günter Heerklotz, Dresden, Germany, assignors to VEB Kamera- und Kinowerke Dresden, Dresden, Germany
Filed July 17, 1961, Ser. No. 124,445
4 Claims. (Cl. 95—57)

The invention relates to an arrangement for the setting of the exposure time for photographic cameras having curtain-type shutters.

In the photographic cameras known hitherto having curtain-type shutters for the setting of the exposure time as a rule adjustable rotating knobs with a scale disc are arranged on the upper side of the camera, on which the different exposure times are entered for which the curtain-type shutter is arranged. The setting to the desired exposure time here takes place by rotation of the time-setting knob in relation to a setting mark provided on the camera side. In some cameras two setting knobs are provided for the setting of the exposure time, one of which covers the range of short exposure times and the other the range of long exposure times. In further improvement of the photographic cameras with curtain-type shutter a simplification was effected as regards the operation and the setting of the exposure time due to the fact that one single time-setting knob is provided for this purpose, which covers all exposure times, that is to say both short and long exposure times.

It is common to all these known embodiments that due to the arrangement of one single time-setting knob and more especially in the case of the arrangement of two setting knobs, the upper side of the camera accordingly is fully occupied. This hinders the arrangement and operation of further arrangements, such for example as the operating handle for the shutter cocking and film winding and the rewinding knob. Furthermore this arrangement also has an unfavourable effect for the installation of a viewfinder, a range finder and an exposure meter and control arrangement.

In the meantime a camera has become known wherein an improvement is achieved due to the fact that in place of a time-setting knob arranged on the upper side of the camera a time-setting disc is provided and this is mounted in counter-sunk fashion in the camera. The setting of the time-setting disc here takes place through a slider arranged movably on the back of the camera, which possesses a scale with the settable exposure times and is connected with the time-setting disc through a rack gearing. This embodiment in fact does not hinder the arrangement of further devices on the top of the camera, but nevertheless it does not constitute a satisfactory solution. This is due above all to the fact that in the case of the slider arrangement the slot guide necessary here cannot be sealed off adequately against penetration by dirt and dust and that the length of the slider travel is limited by the shape of the camera. Thus the setting movement, in which at the same time the detent effect of the time-setting disc must also be overcome, is accordingly made more difficult.

The invention is based upon the problem of achieving a further improvement over the known time-setting arrangements for curtain-type shutter cameras due to the fact that on the one hand due to the arrangement of the time-setting disc the installation of a viewfinder, an exposure meter and control arrangement and a range finder is not hindered and on the other hand the setting of the time-setting disc is not made difficult even in the case of a strong detent action and furthermore is easily accessible. A further requirement here consisted in so arranging the time-setting arrangement that it is protected at the same time against dirt and dust in an adequate fashion. These conditions are fulfilled according to the time-setting arrangement of the invention due to the fact that the time-setting disc is mounted in the upper camera space, covered by a viewing panel—preferably in the region over one film spool—and with the time-setting disc there is associated a stepping mechanism with an operating member operable outside the camera.

According to a preferred embodiment the setting of the time-setting disc takes place by means of one or two presser keys movable in parallel direction in relation to the objective lens and guided in the camera housing, which cooperate by means of a shift pawl in each case with the shift wheels connected with the time-setting disc. Where one single press key is provided the time-setting disc is shifted always in one direction of rotation, while where two press keys guided one within the other in accordance with the invention are provided the time-setting disc is shifted in one direction of rotation by one press key and in the opposite direction of rotation by the other press key. According to a modified embodiment a setting ring preferably mounted centrally in relation to the objective lens is provided for the setting of the time-setting disc, which ring in combination with a pawl co-operates with the shaft wheel of the time-setting disc.

According to all possible embodiments of the invention the tooth spacing of the shift wheels connected with the time-setting disc corresponds to the scale spacing of the intended exposure times provided on the time-setting disc. The tooth spacing of the shift wheels can however also be so constructed that for example in each case a plurality of shift teeth correspond to one scale spacing of the times-setting disc.

According to a further development of the invention the time-setting disc and its setting members are so constructed and arranged in the camera housing that both the upper side of the camera and also the upper space thereof are available in full length and width for the assembly or installaiton of additional arrangements. This is achieved essentially due to the fact that only the cam disc serving for the control of the exposure slot and for the running off of the curtains is arranged rotatably in the upper space of the camera—preferably on the cam disc closing off the film spool space, and for the setting of the cam disc there is provided a setting ring geared therewith, which is mounted on the camera coaxially with the objective lens and carried a scale with the settable exposure times. With the setting ring there can also be associated a transparent scale disc provided with the exposure times, which extends in a manner known per se into the optical viewfinder provided in the camera and thus renders the set exposure time in each case visible therein simultaneously with the viewfinder image.

According to this embodiment of the invention thus the time-setting disc connected with the disc cam for the control of the exposure slot and carrying the scale of the exposure times, and also the viewing panel here necessary rendering possible the reading of the exposure times set in each case are omitted.

The region on the top and in the upper space of the camera otherwise occupied by these arrangements can thus be utilised for the assembly and installation of additional arrangements. Thus the requirements are provided for the arrangement, apart from a viewfinder device associated with the objective lens with roof prism, without hindrance beside the latter, of other devices, preferably the exposure meter and control arrangement.

Further features of the invention may be seen from the examples of constructional forms of the invention explained in the following description and represented diagrammatically in the accompanying drawings. All details have been omitted from the drawings which are unnecessary for the understanding of the invention.

FIGURES 1 to 4 relate to an example of a constructional form of the invention according to which the setting of the time-setting disc is effected by a stepping mechanism controlled by means of press keys.

FIGURE 1 here shows a front elevation of the camera;

FIGURE 2 shows a plan view of this camera;

FIGURE 3 shows in enlarged representation a part of the camera in lateral elevation and section with the time-setting disc arranged in the camera and the stepping mechanism connected therewith;

FIGURE 4 shows a plan view of FIGURE 3 in section.

FIGURE 5 relates to another example of the invention according to which the setting of the time-setting disc is effected by a stepping mechanism in connection with a setting ring mounted coaxially with the objective lens.

Figure 6:
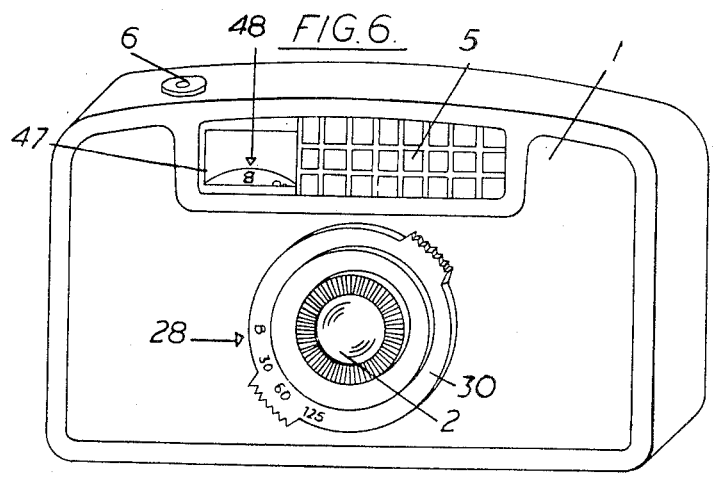
Figure 7:
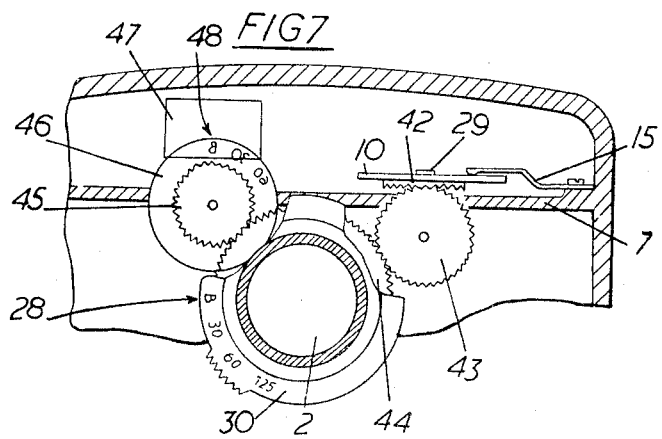

FIGURES 6 and 7 relate to a further example of the invention according to which the setting of the time-setting disc takes place through a gear connection by means of a setting ring mounted coaxially with the objective lens. Here FIGURE 6 shows a front elevation of a curtain-type shutter camera, FIGURE 7 a part thereof in section with the time-setting arrangement in accordance with the invention.

Where the individual parts are in conformity in the examples of embodiment, they have the same reference numerals.

According to the example shown in FIGURES 1 to 4, in the curtain-type shutter camera 1 on its front there is provided an objective lens 2 and in its upper space there is provided an arrangement for the measurement and control of the exposure time, of which there are only shown the meter scale 3 with a pointer 4 and the honeycomb lens 5. For the release of the curtain-type shutter (not shown) there is provided a release knob 6 which is movable parallel to the optical axis of the objective lens 2. In the upper camera space the time-setting disc with the stepping mechanism is arranged internally on a plate 7 formed integrally with the housing of the camera and dividing the interior of the housing into upper and lower compartments, namely in the region over one film spool. This arrangement consists essentially of a time-setting disc 8 and a spindle 9 connected therewith, with which there are also firmly connected in rotationally secured fashion a cam disc 10, two shift wheels 11, 12 and finally a catch disc 13. This wheel assembly receives its rotatable mounting through a bearing 14 in the housing plate 7. The setting members and escapements (not shown) which regulate the running off and the slot formation of the curtains according to the exposure time set in each case are controlled by the cam disc 10. In the catch recesses of the catch disc 13 there engages a catch spring 15 arranged fast with the housing, arresting the time-setting knob in the set position in each case. The spacing of the catch recesses corresponds to the scale division of the exposure times entered on the time-setting disc 8.

With the two shifts wheels 11, 12 there co-operate two press keys 16, 17 which are movable in the direction parallel with the objective lens 2 and are guided in the camera housing 1. The two press keys 16, 17 are constructed as cylindrical hollow bodies and guided one within the other, a compression spring 18 lying in their cavity returning the two press keys 16, 17 into the initial position as shown in FIGURE 4. Stop collars 19, 20 provided on the press keys 16, 17 determine this initial position. The press key 16 possesses a lateral lug 21, on which there is movably mounted a pawl 23 subject to the action of a spring 22 and co-operating with the lower shift wheel 12. The other press key 17 also possesses a lateral lug 24 which there is movably mounted a shift pawl 26 subject to the action of a spring 25, and co-operating with the upper shift wheel 11. Over the time-setting disc 8 there is also arranged a viewing panel 27 which can preferably be constructed as a magnifying glass for the purpose of enlargement of the exposure figures. As shown especially by FIGURE 4, the shift teeth of the two shift wheels 12 are constructed oppositely to one another. So that the alternate rotation of the time-setting disc 8 by shift pawls 23, 26 connected with the press keys 16, 17 is not prevented, these pawls are moved by means of their angle arm resting on the housing, in the initial position, out of the region of the shift teeth of the two shift wheels 11, 12, as shown especially by FIGURE 4.

On actuation of the press key 16 projecting on the front of the camera its shift pawl 23 rotates the lower shift wheel 12 and the time-setting disc 8 connected therewith by the amount of one scale division in relation to the setting mark 28 fast with the housing, and thus sets for example the time-setting disc 8 set according to FIGURE 2 to "flash contact" to the number 30, that is to say to an exposure time of $\frac{1}{30}$ sec. If on the other hand the press key 17 projecting on the back of the camera is actuated, then by its shift pawl 26 the upper shift wheel 11 and the time-setting disc 8 connected therewith are rotated in the opposite direction of rotation by the amount of one scale division. Thus according to the abovementioned example the time-setting disc 8 set to "flash contact" is set to the number 60, that is to say to an exposure time of $\frac{1}{60}$ sec. In all the provided possible settings the setting movement of the two press keys 16, 17 is limited by the plate 24 arranged on the press key 17 and serving at the same time as stop. The spring 18 here effects in each case the return movement of the press keys 16, 17 into their initial position, which is defined by their collars 19, 20 resting against the camera housing.

The explained setting of the time-setting disc 8 by means of two press keys 16, 17 is advantageous especially for those cameras wherein the setting cam 10 serving for the setting and control of the exposure time cannot be rotated continuously, but receives a fixed abutment after a specific partial revolution. In those cameras wherein the setting cam 10 is continuously rotatable, it is also possible to dispense with the arrangement of two press keys 16, 17. Instead one press key can be provided, namely either the press key projecting on the front or that projecting on the back of the camera. In the case of such an embodiment the shift pawl co-operating with a ratchet wheel can also be so constructed that it constantly remains in tooth engagement with a ratchet wheel 11, 12 connected with the time-setting disc 8. The press keys 16, 17 are preferably so arranged—as illustrated especially by FIGURE 1—in the camera housing 1 that they lie on one half of the camera at the same distance from the object lens 2 and the honeycomb lens 5 as does the release knob 6 arranged on the other camera half. Thus apart from a symmetrical arrangement the object is achieved at the same time that the release knob 6 can be actuated by one finger of the right-hand and the press key 16 by one finger of the left-hand in easily accessible finger.

According to the example of embodiment in FIGURE 5 again a time-setting disc 8 is provided beneath a viewing panel 27, which disc at the same time possesses catches with which there engages a catch spring 15 secured in the camera housing 1. With the time setting disc 8 there are firmly connected through a hollow spindle 9 the cam disc 10 and a shift wheel 11 provided with shaft teeth. This wheel assembly is mounted in rotatable fashion about an upright bolt 29 secured on the housing plate 7. For the setting of the time-setting disc 8 there serves a setting ring 30 mounted on the camera 1 coaxially with the objective lens 2, which ring can be partially or completely milled on the periphery or can also be provided with a milled handle 31. The movement of this setting ring 30 is limited by a circular recess 32 which abuts on a stop pin 33 secured on the camera side. The setting ring 30 possesses on its periphery a lug extending into the interior of the housing with a slot 34 through which a push rod 36 engages by means of a pin 35. This rod is moved back into the initial position by the action of a spring 37 hooked on the camera housing 1, the initial position being limited by the stop pin 33. The push rod 36 guided in the two mountings 38, 39 on the housing sides possesses a movably mounted shift pawl 40, which engages due to the action of a spring 41 in the teeth of the shift wheel 11.

By an appropriate pivotal movement of the setting 30, in connection with the push rod 36, through the shift pawl 40 the shift wheel 11 is rotated step-by-step and the time-setting disc 8 connected therewith is set to the intended exposure time. Here the catch spring 15 effects the arresting of the time-setting disc 8 in the set position in each case.

According to the examples of embodiment as represented in FIGURES 6 and 7 in the case of the curtain-type shutter camera 1 on its front there is provided the objective lens 2 and in its upper space there is provided an arrangement for the measurement and control of the exposure time, of which only the honey comb lens 5 is illustrated. Furthermore here a viewfinder arrangement is also provided which will be explained hereinafter. For the release of the curtain-type shutter (not shown) there serves the release knob 6 provided on the upper side of the camera 1, which knob can be arranged for vertical movement parallel with the front of the camera 1.

In the upper camera space, internally on the housing plate 7, the cam disc 10 with the crown wheel 42 connected therewith is mounted for rotation about the upright bolt 29 which is secured on the housing plate 7. The cam disc 10 possesses catch recesses adapted appropriately to the intended settings, with which recesses there engages the catch spring 15 arranged fast with the housing, thereby arresting the set position in each case. The control disc 10 is connected through its crown wheel 42 through an intermediate wheel 43 with a central wheel 44 mounted on the camera housing 1 coaxially with the objective lens 2 and coupled with the setting ring 30 also mounted coaxially with the objective lens 2. The setting ring at the same time carries the scale for the intended exposure times and is settable in relation to a setting mark 28 fast with the housing.

Thus the setting ring 30 serves for the setting of the exposure times. Its setting movement is transmitted through the central wheel 44 connected therewith, through the intermediate wheel 43 to the crown wheel 42 and the cam disc 10 connected therewith, through which then according to the exposure time set in each case, through suitable control means (not shown in the drawing) the exposure slot of the curtains is set and their running off is regulated.

In further development of the invention through a further intermediate wheel 45 an additional scale disc 46 secured therewith can be connected with the central wheel 44, which disc 46 consists of transparent material and carries the settable exposure times. This scale disc 46 is so arranged that it extends in a manner known per se with the entered exposure times into the region of a viewfinder 47, which possesses a stationary setting mark 48. This viewfinder 47 can be constructed for example as direct-viewfinder or measuring viewfinder. The scale disc 46 can also be associated however, in the case of monocular mirror reflex cameras, with the optical reversal system here provided—for example the roof prism.

In all these possible embodiments the object is achieved that the exposure time settable in each case by the setting ring 30 is transmitted on the one hand accordingly to the cam disc 10 for the setting and regulation of the running off of the shutter and the slot formation, and on the other hand the exposure time set in each case is indicated both by the setting ring 30 in relation to the setting mark 28 fast with the housing and also in the viewfinder 47 by the scale disc 46 in relation to a further setting mark 48. Furthermore—as illustrated especially by FIGURE 7—due to the arrangement and construction of the cam disc 10 in accordance with the invention the space made free above this disc can be utilised in its full length and width for the installation and assembly of further additional arrangements, for example the arrangements for the measurement and regulation of the exposure time. In special cases it is possible to dispense with the entering of the exposure times on the setting ring 30, so that merely the exposure time set in each case is visible in the viewfinder 48.

We claim:

1. In a photographic camera having a housing, a curtain-type shutter device mounted in the housing, an objective lens carried by said housing, exposure time control mechanism within the housing and operatively connected to said shutter device, a rotatable control member operatively connected to said exposure mechanism to set the exposure time according to the rotational position of said control member; the provision of a compartment arranged in the upper part of said housing adjacent an opening therein, a transparent viewing panel mounted in the housing and sealing the opening, a spindle mounted for rotation within said housing and carrying said control member, an indicating disc carrying an exposure time scale in said compartment and mounted on said spindle and capable of being viewed through the panel, means for locating said disc relative to a fixed point on said housing at each exposure time value, a first toothed wheel mounted on said spindle, a first depressible member extending through the housing, a first shift pawl, within the housing, mounted on said first depressible member and engageable with said first toothed wheel to drive the shaft in a direction to increase the exposure time, a second toothed wheel mounted on said spindle, a second depressible member, extending through the housing, and a second shift pawl, within the housing, mounted on said second depressible member and engageable with said second toothed wheel to drive the shaft in a direction to decrease the exposure time.

2. A photographic camera according to claim 1, wherein said first and second depressible members are in the form of two coaxial tubular push-buttons slidable one within the other, one push-button extending through the front of the housing and the other through the rear; spring means within said push buttons for urging the latter apart, and first and second stops attached to said push-buttons respectively, which stops are engageable with the housing to limit the extent of the push-buttons through the housing.

3. A photographic camera according to claim 2, wherein a spring is provided on each pawl to urge the latter out of engagement with the respective toothed wheel when the depressible member is in its normal rest position.

4. In a photographic camera having a housing, a curtain-type shutter device mounted in the housing, an objective lens carried by said housing, exposure time control mechanism within the housing and operatively connected to said shutter device, a rotatable control member operatively connected to said exposure mechanism to set the exposure time according to the rotational position of said control member; the provision of a compartment arranged in the upper part of said housing adjacent an opening therein, a transparent viewing panel mounted in the housing and sealing the opening, a spindle mounted for rotation within said housing and carrying said control member, an indicating disc carrying an exposure time scale in said compartment and mounted on said spindle and capable of being viewed through the panel, a first toothed wheel mounted on said spindle, a first depressible member extending through the housing, a first shift pawl within the housing, mounted on said first depressible member and engageable with said first toothed wheel to drive the shaft in a direction to increase the exposure time, a second toothed wheel mounted on said spindle, a second depressible member extending through the housing, a second shift pawl, within the housing, mounted on said second depressible member and engageable with said second toothed wheel to drive the shaft in a direction to decrease the exposure time, a third toothed wheel mounted on said spindle, and a catch spring mounted on a fixed point on the housing and in engagement with said third toothed wheel to locate the latter at each exposure value.

References Cited by the Examiner

UNITED STATES PATENTS

| | | | |
|---|---|---|---|
| 687,330 | 11/01 | McCurdy | 235—91.3 |
| 1,389,827 | 9/21 | Hagan | 235—91.3 |
| 1,571,670 | 2/26 | Howell | 95—64 |
| 2,186,614 | 1/40 | Mihayli | 95—57 |
| 2,218,252 | 10/40 | Stoiber | 95—57 |
| 2,388,609 | 11/45 | Ericsson. | |
| 2,860,560 | 11/58 | Traino | 95—45 |
| 2,891,455 | 6/59 | Stein et al. | 95—57 |
| 2,917,984 | 12/59 | Faulhaber | 95—64 |
| 2,929,307 | 3/60 | Trum et al. | 95—63 X |
| 2,982,194 | 5/61 | Hannafin | 95—53 |

NORTON ANSHER, *Primary Examiner.*

DELBERT B. LOWE, JOHN M. HORAN, *Examiners.*